US009124457B2

(12) United States Patent
Pustovalov et al.

(10) Patent No.: US 9,124,457 B2
(45) Date of Patent: Sep. 1, 2015

(54) FREQUENCY DOMAIN EQUALIZATION FOR WIRELESS COMMUNICATION (75) Inventors: Evgeny Vasilievich Pustovalov, Saint-Petersburg (RU); Evgeny Alexandrovitch Bakin, Saint-Petersburg (RU); Grigory Sergeevich Evseev, Saint-Petersburg (RU); Andrey Mihailovich Turlikov, Saint-Petersburg (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/976,029

(22) PCT Filed: Mar. 30, 2011

(86) PCT No.: PCT/RU2011/000201
§ 371 (c)(1),
(2), (4) Date: Sep. 9, 2013

(87) PCT Pub. No.: WO2012/134319
PCT Pub. Date: Oct. 4, 2012

(65) Prior Publication Data
US 2014/0086299 A1    Mar. 27, 2014

(51) Int. Cl.
*H04L 27/06* (2006.01)
*H04L 25/03* (2006.01)
*H04L 25/02* (2006.01)

(52) U.S. Cl.
CPC ........ *H04L 25/03159* (2013.01); *H04L 25/022* (2013.01); *H04L 25/025* (2013.01); *H04L 25/0238* (2013.01); *H04L 25/03171* (2013.01); *H04L 2025/03707* (2013.01)

(58) Field of Classification Search
CPC ................ H04L 25/022; H04L 25/025; H04L 25/03171; H04L 2025/03707; H04L 25/067; H04L 1/0045; H04L 27/2647; H04L 1/005; H04L 1/0054; H04L 1/20; H04N 5/4401; H04B 1/30; H04B 1/28

USPC .......................................... 375/340, 316, 219
See application file for complete search history.

(56) References Cited

U.S. PATENT DOCUMENTS 6,700,919 B1    3/2004    Papasakellariou
2003/0058951 A1    3/2003    Thomson et al.
(Continued)

FOREIGN PATENT DOCUMENTS

EP    0717559    6/1996
EP    1294150    3/2003
(Continued)

OTHER PUBLICATIONS

International Search Report and Written Opinion for PCT Application No. PCT/RU2011/000201, mailed on Jun. 13, 2012, 16 Pages.
(Continued)

*Primary Examiner* — Zewdu Kassa
(74) *Attorney, Agent, or Firm* — Shichrur & Co.

(57) ABSTRACT

Some demonstrative embodiments include devices, systems and/or methods of equalizing received wireless communication signals. For example, a device may include a pre-decoding equalizer to determine a plurality of filter weights by applying both a blind-equalization and a least-mean-squares (LMS) equalization to a wireless communication signal received over a wireless communication channel; a channel estimator to estimate a channel frequency response of the channel based on the filtering weights; and a turbo-equalization scheme including a decoder to decode the wireless communication signal and a turbo equalizer to equalize the decoded wireless communication signal using the estimated channel frequency response.

24 Claims, 7 Drawing Sheets

(56) References Cited

U.S. PATENT DOCUMENTS

| | | | |
|---|---|---|---|
| 2004/0125863 | A1 | 7/2004 | Ghosh |
| 2007/0133672 | A1 | 6/2007 | Lee et al. |
| 2007/0183517 | A1* | 8/2007 | Liu et al. ............. 375/260 |
| 2009/0245338 | A1 | 10/2009 | Jonsson |
| 2009/0285274 | A1* | 11/2009 | Shiue et al. ............ 375/224 |
| 2010/0128774 | A1 | 5/2010 | He |
| 2010/0232491 | A1 | 9/2010 | Hayashi |
| 2011/0004803 | A1 | 1/2011 | Yokomakura et al. |
| 2011/0069742 | A1 | 3/2011 | Narayan et al. |
| 2012/0099637 | A1* | 4/2012 | Hu et al. ............... 375/232 |
| 2014/0211837 | A1 | 7/2014 | Bakin et al. |

FOREIGN PATENT DOCUMENTS

| | | |
|---|---|---|
| EP | 1584168 | 1/2007 |
| GB | 2449554 | 11/2008 |
| JP | 2003152603 | 5/2003 |
| JP | 2006352218 | 12/2006 |
| JP | 2010087707 | 4/2010 |
| WO | 2009099092 | 8/2009 |

OTHER PUBLICATIONS

Wu et al., "Low Complexity Adaptive Turbo Frequency-Domain Channel Estimation for Single-Carrier Multi-User Detection", IEEE Transactions on Wireless Communications, vol. 7, No. 11, Nov. 2008, pp. 4094-4099.

Pancaldi et al.,"Single-Carrier Frequency Domain Equalization" IEEE Signal Processing Magazine, vol. 25, No. 5, Sep. 2008, pp. 37-56.

Benvenuto et al., "Single Carrier Modulation With Nonlinear Frequency Domain Equalization: An Idea Whose Time Has Come—Again", Proceedings of the IEEE, vol. 98, No. 1, Jan. 2010, pp. 69-96.

H. Liu, P. Schniter, H. Fu, R.A. Casas, "Frequency Domain Turbo Equalization for Vestigial Sideband Modulation with Punctured Trellis Coding", Signal Processing Advances in Wireless Communications, 2006; 5 pages.

ATSC Digital Television Standard Part 2—RF/Transmission System Characteristics, Jan. 3, 2007, 44 pages.

Pham et al., "Enhanced ATSC DTV Channel Estimation", IEEE Conference on Electrical and Computer Engineering, Canada, 2009, 5 pages.

Hyoung-Nam Kim et al., "Near-Optimum Blind Decision Feedback Equalization for ATSC Digital Television Receivers", ETRI Journal, vol. 26, No. 2, Apr. 2004, 11 pages.

Mackenzie, Abert, SET "General description of laboratory tests—Multipath interference", DTV Field Test Report in Brazil, Jul. 2000, 282 pages.

Office Action for Japanese Patent Application No. 2012-010985, mailed on Jun. 18, 2013, 4 pages, including 2 pages of English translation.

Notice of Allowance for Japanese Patent Application No. 2012-010985, mailed on Jul. 23, 2013, 2 pages, including 1 page of English translation.

International Preliminary Report on Patentability for PCT/RU2011/000201, mailed on Oct. 10, 2013, 11 pages.

International Search Report and Written Opinion for PCT/RU2012/000382, mailed on Feb. 14, 2013, 8 pages.

International Search Report and Written Opinion for PCT/RU2012/000042, mailed on Oct. 11, 2012, 13 pages.

International Search Report and Written Opinion for PCT/RU2011/001047, mailed on Sep. 21, 2012, 14 pages.

Labat, et al., "Adaptive Decision Feedback Equalization: Can You Skip the Training Period", IEEE Transactions on Communications, vol. 46, No. 7, Jul. 1998, pp. 921-930.

Wang, et al., "Design and Implementation of Frequency Domain Equalizer for ATSC System", Broadband Multimedia Systems and Broadcasting, 2008 IEEE, 6 pages.

Hong, et al., "Iterative Frequency-Domain Channel Estimation and Equalization for Single-Carrier Transmissions Without Cyclic-Prefix", IEEE Transactions on Wireless Communications,vol. 7, No. 10, Oct. 2008, pp. 3686-3691.

Zarzoso, et al., "Blind Channel Equalization With Algebraic Optimal Step Size", Sep. 4-8, 2005, 4 pages.

Zarzoso, et al., "Semi-Blind Constant Modulus Equalization With Optimal Step Size", ICASSP—2005, Philadelphia, Mar. 18-23, 2005, pp. 1-4.

Mendes, et al., "MI-SBTVD: A Proposal for the Brazilian Digital Television System SBTVD", MI-SBTVD: A Proposal for the Brazilian Digital Television System SBTVD, vol. 13, Issue 1, Mar. 2007, pp. 57-82.

Yasmin, et al., "Blind Channel Equalization in Impulse Noise", International Journal of Communications, Issue 3, vol. 5, 2011, pp. 132-140.

"ATSC Recommended Practice: Receiver Performance Guidelines", Advanced Television Systems Committee, Inc., Document A/74:2010, Apr. 7, 2010, 88 pages.

Hatae, et al., "Comparing Single and Multiple Carrier Schemes Using Channel Coding", Aug. 30-31, 2006, 5 pages.

Banovic, "Adaptive Equalization: A Tutorial", Research Centre for Integrated Microsystems—University of Windsor, Oct. 14, 2005, 25 pages.

Ta-Hong, et al., "Decision Feedback Equalizer", Version 1.4: Nov. 14, 2007, pp. 1-2.

Garg, "Adaptive Equalization Techniques using Least Mean Square (LMS) Algorithm", Electrical Engineering, Term Paper, Sep. 12, 2009, 11 pages.

Sohail, et al., "A Non-Iterative Channel Estimation and Equalization Method for TDS-OFDM Systems", Wireless Communications and Mobile Computing Conference (IWCMC), 7th International, Jul. 4-8, 2011, 5 pages.

Takeda, et al., "Joint Tomlinson-Harashima Precoding and Frequency-Domain Equalization for Broadband Single-Carrier Transmission", IEICE Trans. Communication, vol.E91-B, No. 1, Jan. 2008, pp. 258-266.

Office Action for Chinese Patent Application No. 201210103912.2, mailed on Jan. 28, 2015, 7 pages, including 4 pages of English translation.

Office Action for Korean Patent Application No. 10-2013-7025262, mailed on Oct. 29, 2014, 9 pages, including 4 pages of English translation.

Office Action for Chinese Patent Application No. 201210103912.2, mailed on Jun. 4, 2014, 19 pages, including 12 pages of English translation.

Mackenzie, "Presentation", Mackenzie HDTV NEC, ABERTSET Feb. 5, 2000, 282 Pages.

International Preliminary Report on Patentability and Written Opinion for PCT Patent Application No. PCT/RU2011/001047, mailed on Jul. 10, 2014, 9 pages.

International Preliminary Report on Patentability and Written Opinion for PCT Patent Application No. PCT/RU2012/000042, mailed on Aug. 14, 2014, 8 pages.

Dai Wenyi "Research on Turbo Equalization of Wireless Communication Systems", Dec. 2008, 93 pages.

* cited by examiner

FREQUENCY DOMAIN EQUALIZATION FOR WIRELESS COMMUNICATION

CROSS REFERENCE

This application is a National Phase Application of PCT International Application No. PCT/RU2011/000201, International Filing Date Mar. 30, 2011, the entire disclosure of which is incorporated herein by reference.

BACKGROUND

Some wireless communication systems ("non-OFDM systems") may implement a communication scheme other than Orthogonal-Frequency-Division-Multiplexing (OFDM), e.g., a single-carrier communication scheme.

A receiver operating in a non-OFDM system may utilize a time-domain Decision-Feedback-Equalizer (DFE), for example, to suppress inter-symbol interference. However, the DFE may be relatively complex, for example, in systems utilizing long impulse response channels, e.g., in Digital Television (DTV) systems.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area Network (WVAN), a Local Area Network (LAN), a Wireless LAN (WLAN), a Wireless Metropolitan Area Network (WMAN) communication system, a Personal Area Network (PAN), a Wireless PAN (WPAN), units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), or the like.

Some embodiments may be used in conjunction with "television signal(s)" or "digital television signals", for example, signals carrying television information, signals carrying audio/video information, Digital Television (DTV) signals, digital broadcast signals, Digital Terrestrial Television (DTTV) signals, signals in accordance with one or more Advanced Television Systems Committee (ATSC) standards, Vestigial SideBand (VSB) digital television signals (e.g., 8-VSB signals), Digital Video Broadcasting-Terrestrial (DVB-T) signals, DVB-T2 signals, Integrated Services Digital Broadcasting (ISDB) signals, digital television signals carrying MPEG-2 audio/video, digital television signals carrying MPEG-4 audio/video or H.264 audio/video or MPEG-4 part 10 audio/video or MPEG-4 Advanced Video Coding (AVC) audio/video, Digital Multimedia Broadcasting (DMB) signals, DMB-Handheld (DMB-H) signals, High Definition Television (HDTV) signals, progressive scan digital television signals (e.g., 720p), interlaced digital televisions signals (e.g., 10180i), television signals transferred or received through a satellite or a dish, television signals transferred or received through the atmosphere, signals that include (in whole or in part) non-television data (e.g., radio and/or data services) in addition to or instead of digital television data, or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Some embodiments may be implemented for wireless transmission of suitable content between two or more devices. In one embodiment, the content may include media content, for example, audio and/or video content, e.g., High Definition Television (HDTV) content, and the like. In other embodiments, the content may include any other suitable data, information and/or signals.

Figure 1:
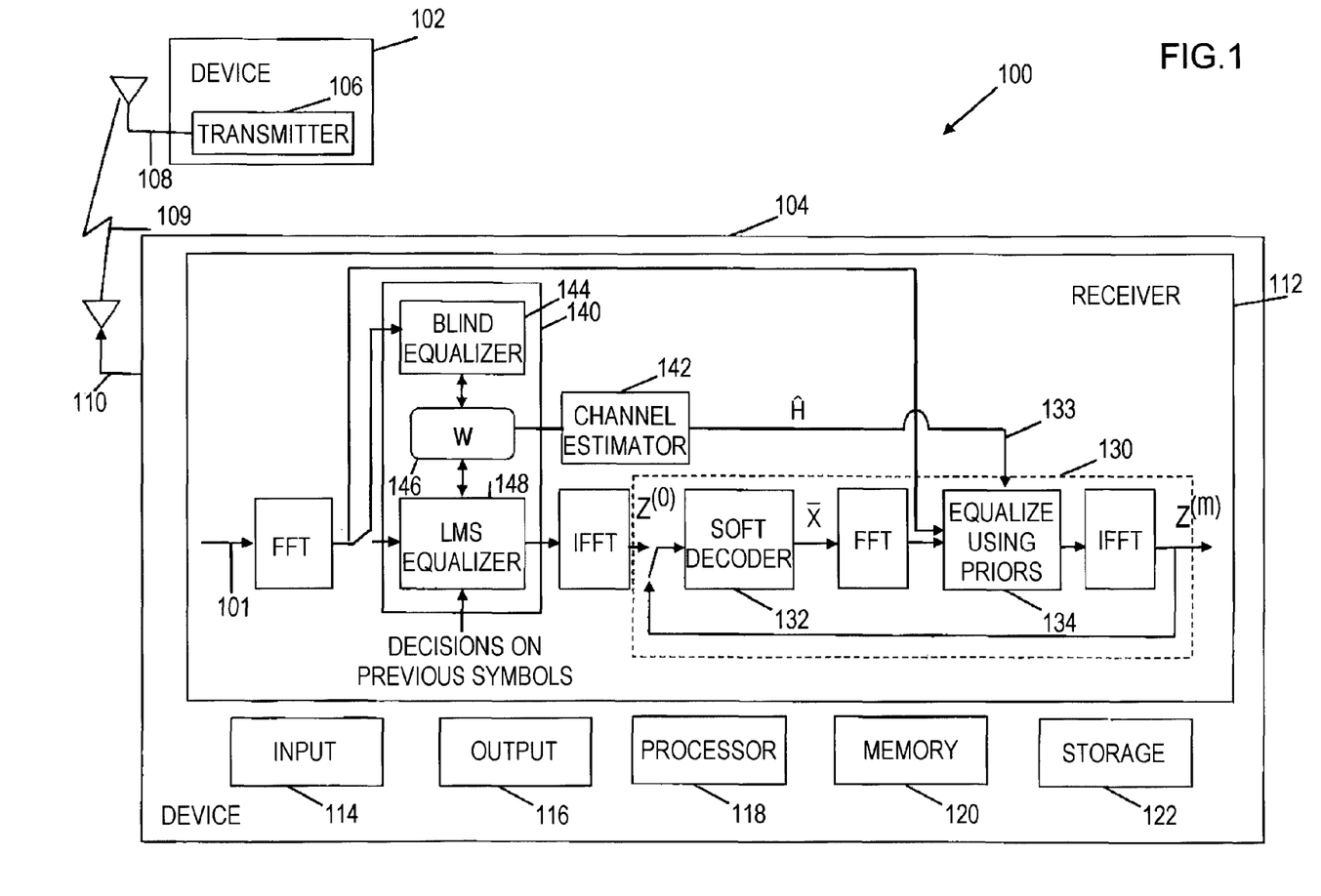
FIG. 1 is a schematic block diagram illustration of a system, in accordance with some demonstrative embodiments.

Reference is now made to FIG. 1, which schematically illustrates a block diagram of a system 100 in accordance with some demonstrative embodiments.

In some demonstrative embodiments, system 100 may include one or more devices, e.g., devices 102 and 104, capable of communicating wireless signals over a wireless communication channel 109. For example, device 102 may include a transmitter 106 capable of transmitting wireless signals via one or more antennas; and/or device 104 may include a receiver 112 capable of receiving the wireless signals via one or more antennas 110. Antennas 108 and/or 110 may include any type of antennas suitable for transmitting and/or receiving wireless communication signals, blocks, frames, transmission streams, packets, messages and/or data. Types of antennas that may be used for antennas 108 and/or 110 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 108 and/or 110 may implement transmit and receive functionalities using separate transmit and receive antenna elements. In some embodiments, antennas 108 and/or 110 may implement transmit and receive functionalities using common and/or integrated transmit/receive elements.

In some demonstrative embodiments, system 100 may implement a communication scheme ("non-OFDM communication scheme") other than Orthogonal-Frequency-Division-Multiplexing (OFDM), e.g., a single-carrier communication scheme, a DTV system, and the like.

In some demonstrative embodiments, system 100 may include or may perform the functionality of one or more elements of a DTV system. In some embodiments, device 102 may include a DTV base station. For example, transmitter 106 may include a suitable DTV transmitter capable of transmitting wireless DTV signals, e.g., in accordance with "*ATSC Digital Television Standard Part 2—RF/Transmission Characteristics (A/53, Part 2:2007)*", Jan. 3, 2007 ("the ATSC standard") and/or any other suitable standard, specification and/or protocol. According to these embodiments, receiver 112 may be configured to receive the DTV signals.

In some demonstrative embodiments, device 104 may include or may be included as part of, for example, a computing device, a communication device, a wireless communication device, an electronic device, a circuit, and/or any other suitable device. For example, device 100 may include or may be included as part of a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, an AP, a base station, or the like.

In some demonstrative embodiments, device 104 may also include, for example, one or more of a processor 118, an input unit 114, an output unit 116, a memory unit 120, and a storage unit 122. Device 104 may optionally include other suitable hardware components and/or software components. In some embodiments, some or all of the components of device 104 may be enclosed in a common housing or packaging, and may be interconnected or operably associated using one or more wired or wireless links. In other embodiments, components of device 104 may be distributed among multiple or separate devices or locations.

Processor 118 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 118 executes instructions, for example, of an Operating System (OS) of device 104; and/or of one or more suitable applications.

Input unit 114 includes, for example, a keyboard, a keypad, a mouse, a touch-pad, a track-ball, a stylus, a microphone, or other suitable pointing device or input device. Output unit 116 includes, for example, a monitor, a screen, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, store data processed by device 104.

In some demonstrative embodiments, receiver 112 may receive via antennas 110 a wireless communication signal 101, denoted Y, over channel 109, e.g., from device 102. Receiver 112 may implement an iterative (turbo) equalization scheme 130, for example, a suitable Frequency Domain Turbo Equalization (FDTE) scheme, to iteratively decode and equalize wireless communication signal 101.

In some demonstrative embodiments, turbo equalization scheme 130 may include a suitable decoder 132 to decode wireless communication signal 101, and a suitable turbo equalizer 134 to equalize the decoded wireless communication signal using an estimation 133 of a channel impulse response, denoted $\hat{H}$, of the channel 109 between devices 102 and 104. The output of equalizer 134 may be fed back as input to decoder 132 in order to iteratively decode and equalize signal 101.

In some demonstrative embodiments, an equalized output, denoted $Z_k$, of equalizer 134 corresponding to a k-th subcarrier of signal 101 may be determined, for example, as follows:

$$Z_k = \overline{X}_k + F_k(Y_k - \hat{H}_k \overline{X}_k); \quad (1)$$

$$F_k = \frac{\hat{H}_k^*}{|\hat{H}_k|^2 + \frac{\sigma^2}{E[e^2]}}$$

wherein k=0 . . . N-1, wherein N denotes a number of subcarriers used for representing the signal Y in the frequency domain, e.g., N may be equal to a size of a Fast-Fourier-transform (FFT) implemented by receiver 112, wherein $\hat{H}_k$ denotes an estimated channel frequency response of the k-th subcarrier of channel 109, wherein $Y_k$ denotes the received signal over the k-th subcarrier in the frequency domain, wherein $\overline{X}_k$ denotes a Fourier transform of the output of decoder 132, wherein $\sigma^2$ denotes a noise variance corresponding to the channel $\hat{H}$, and wherein $E[e^2]$ denotes a mean square error after decoder 132.

In some demonstrative embodiments, receiver 112 may determine the frequency-domain channel response 133 of channel 109, e.g., prior to performing the turbo equalization with respect to received signal 101.

In some demonstrative embodiments, a repetition period between two consecutive pilot signals received by device 104 over channel 109 may be relatively long compared to a duration of the pilot signals. For example, the repetition period between two consecutive pilot signals received over channel 109 may be at least one hundred times longer than the duration of the pilot signals. In one example, the pilot signal may have a length of 77 microseconds (µs), and the repetition period may be about 24 milliseconds (ms), e.g., if system 100 operates according to the ATSC standard. According to these embodiments, an estimation of channel 109 using the pilot symbols may be inaccurate. The performance of turbo equalization scheme 130 may be affected by an accuracy degree of estimated channel response 133.

In some demonstrative embodiments, receiver 112 may be configured to determine channel response 133 independently of the pilot signals received over channel 109, e.g., as described in detail below.

In some demonstrative embodiments, receiver 112 may include a pre-decoding equalizer 140 configured to determine a plurality of filter weights 146 by applying both a blind-equalization and a least-mean-squares (LMS) equalization to wireless communication signal 101 received over wireless communication channel 109, e.g., as described below.

In some demonstrative embodiments, pre-decoding equalizer 140 may include a blind equalizer 144 to determine a plurality of initial weights by applying the blind-equalization to received wireless communication signal 101; and a LMS equalizer 148 to determine the plurality of filtering weights 146 by adjusting the initial weights according to the LMS equalization, e.g., as described below.

In some demonstrative embodiments, blind equalizer 144 may implement any suitable blind-equalization algorithm, for example, a Sato blind-equalization algorithm, a Constant Modulus Algorithm (CMA), and the like. Blind equalizer 144 may determine the initial weights by minimizing a cost function, which is based on known signal statistics, e.g., mean energy, without requiring, for example, the use of pilot signals.

In some demonstrative embodiments, LMS equalizer 148 may include any suitable equalizer configured to perform a LMS equalization algorithm, e.g., any suitable linear adaptive LMS equalization. For example, LMS equalizer 148 may adjust the initial weights determined by blind equalizer 144 to minimize a mean error at an output of equalizer 148. For example, a weight, denoted $W_k$, of weights 146 corresponding to the k-th subcarrier may be determined to converge to a value providing a minimum mean-square error (MMSE) at the output of equalizer 148, e.g., according to the following condition:

$$W_k \rightarrow \frac{H_k^*}{|H_k|^2 + \gamma}, \quad (2)$$

wherein $\gamma$ denotes an inverse of the signal-to noise ratio (SNR) corresponding to signal 101.

In some demonstrative embodiments, receiver 112 may include a channel estimator 142 to estimate channel frequency response 133 of channel 109 based on the weights 146, e.g., as described below.

In some demonstrative embodiments, channel estimator 142 may determine channel frequency response 133 including a plurality of channel response coefficients ("channel coefficients"), denoted $H_k$, corresponding to the plurality of k channel subcarriers, respectively.

In some demonstrative embodiments, channel estimator 142 may estimate channel frequency response 133 based on the convergence criterion of Equation 2. For example, the channel response coefficient $H_k$ may be determined based on the convergence criterion of Equation 2, e.g., as follows:

$$H_k = W_k^*(A + \gamma), \qquad (3)$$

$$A = |H_k|^2 = \frac{1 - 2|W_k|^2\gamma \pm \sqrt{1 - 4|W_k|^2\gamma}}{2|W_k|^2},$$

As may be seen from Equation 3, the channel response coefficient $H_k$ may have either a first value, denoted $H_k^+$, e.g., if the positive sign is used in Equation 3, or a second value, denoted $H_k^-$, e.g., if the negative, sign is used in Equation 3.

In some demonstrative embodiments, the positive sign should be used in Equation 3, e.g., when γ is small compared to the channel response coefficient $H_k$. The value of γ may be small compared to the channel response coefficient $H_k$, e.g., $\gamma \ll H_k$, for most of the subcarriers, for example, since γ is the inverse of SNR. Accordingly, the positive sign may be used in Equations 3 for most of the subcarriers and, as a result, the estimated channel response coefficient may be approximately the inverse of the corresponding equalizer weight $W_k$. However, in some cases the negative sign should be used in Equation 3, for example, if the channel spectrum of channel 109 includes relatively small values, e.g., values close to zero, the criterion of Equation 2 may prevent equalizer 148 from division by zero, e.g., if an actual frequency response of channel 109 includes one or more nulls.

In one example, a frequency-selective channel response in a DTV system may be caused by simultaneous reception of substantially the same signals from different base stations (BS). If, for example the signals from both BS have equal power at receiver 112, then an actual multipath channel spectrum of channel 109, e.g., a channel response spectrum as shown in FIG. 2, may include one or more "null" ("dip") points 202 having weight values close to zero.

Figure 2:
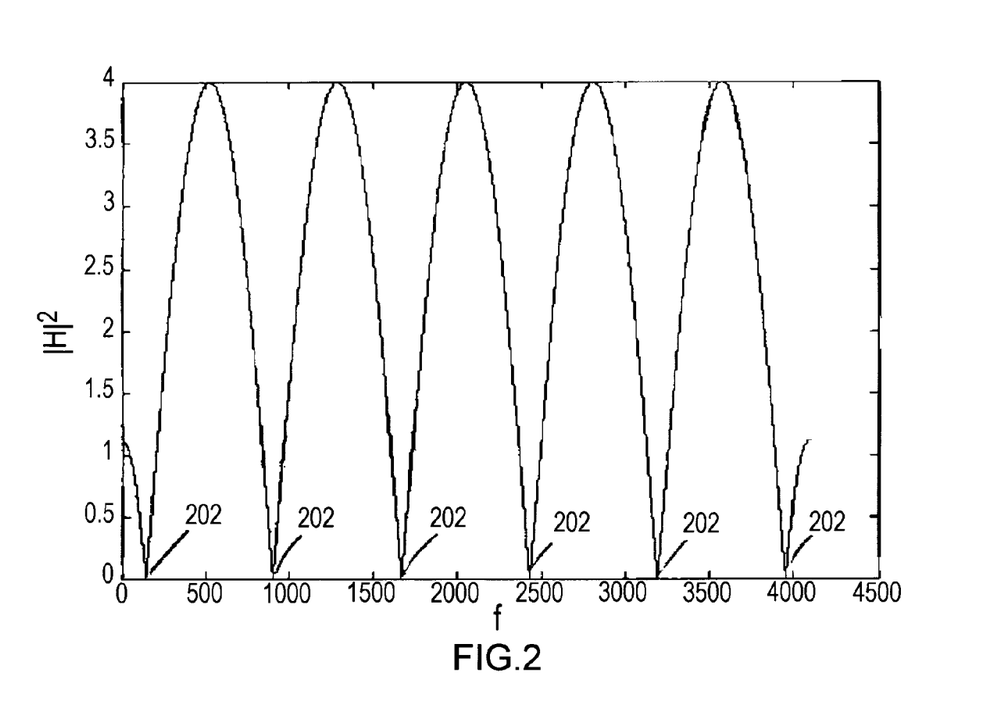
FIG. 2 is a schematic illustration of an actual channel response spectrum of a wireless communication channel, in accordance with some demonstrative embodiments.
Figure 3:
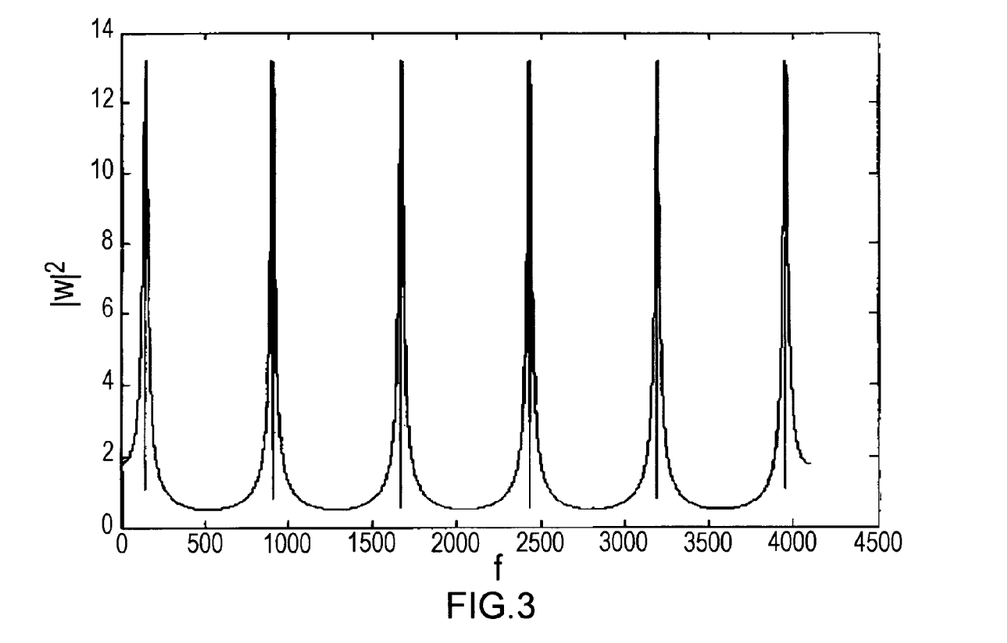
FIG. 3 is a schematic illustration of an equalizer frequency response curve including a plurality of weights corresponding to the channel response spectrum of FIG. 2, in accordance with some demonstrative embodiments.

FIG. 3 schematically illustrates an equalizer frequency response curve including the weights W corresponding to the channel response spectrum of FIG. 2. Solving Equation 3 with the weights W of FIG. 3, while selecting the positive sign of Equation 3 for all subcarriers, may yield the channel frequency response shown in FIG. 4.

Figure 4:
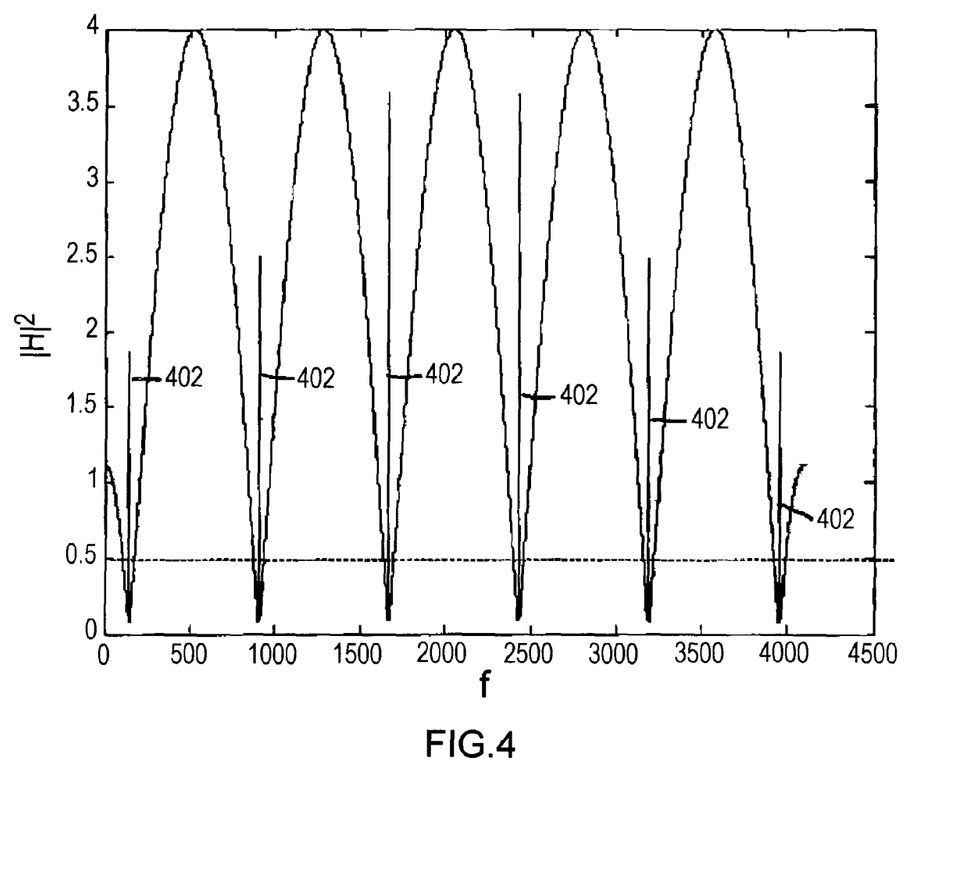
FIG. 4 is a schematic illustration of an estimated channel frequency response, estimated according to the equalizer frequency response curve of FIG. 3, in accordance with some demonstrative embodiments.

As shown in FIG. 4, the use of the positive sign in Equation 3 at points 202 (FIG. 2) may result in erroneous sharp peaks 402 in the estimated channel response coefficients corresponding to the subcarriers of the point 202. These erroneous results may not be resolved, for example, individually for each point 202, since, for example, both channel responses of FIGS. 2 and 4 correspond to the same MMSE equalization.

Referring back to FIG. 1, in some demonstrative embodiments, channel estimator 142 may be capable of estimating the channel response 133, which may not include the erroneous peaks 402 (FIG. 4), for example, even if the actual channel frequency response includes one or more nulls, e.g., as described in detail below.

In some demonstrative embodiments, channel estimator 142 may determine the plurality of channel coefficients $H_k$ satisfying a criterion relating to a peak threshold and a width threshold, as described in detail below.

In some demonstrative embodiments, the criterion may require that, if the channel frequency response includes one or more "lobes", then the width of each of the lobes my be greater than the width threshold, e.g., as described below.

In some demonstrative embodiments, the criterion requires that, if the channel frequency response includes a sequence of one or more channel coefficients $H_k$ greater than the peak threshold, then a width of a respective sequence of one or more subcarriers corresponding to the sequence of channel coefficients is greater than the width threshold.

In some demonstrative embodiments, the use of such criterion may enable channel estimator 142 to correctly estimate the channel frequency response, for example, even when the actual channel frequency response of channel 109 includes one or more nulls.

In some demonstrative embodiments, channel estimator 142 may determine the plurality of channel coefficients $H_k$ according to a first equation. Channel estimator 142 may detect one or more erroneous channel coefficients of the plurality of channel coefficients not satisfying the criterion. Channel estimator 142 may recalculate the one or more erroneous channel coefficients according to a second equation.

In some demonstrative embodiments, the first and second equations may differ by only one sign. For example, the first equation may include Equation 3 with the positive sign, and the second equation my include Equation 3 with the negative sign. According to this example, channel estimator 142 may determine the plurality of channel coefficients $H_k$ according Equation 3 using the positive sign. Channel estimator 142 may detect one or more erroneous channel coefficients of the plurality of channel coefficients not satisfying the criterion. Channel estimator 142 may recalculate the one or more erroneous channel coefficients according to Equation 3 using the negative sign.

In some demonstrative embodiments, e.g., if received signal 101 results from a simultaneous reception of the same signal from different base stations, then a width of "lobes" in the channel response spectrum of FIG. 2 may depend on response duration. For example, a greater distance difference $\Delta = l_1 - l_2$, between a first distance $l_1$, between device 102 and a first BS, and a second distance $l_2$ between device 102 and a second BS, may result in a longer impulse response, which, in turn, may result in narrower channel spectrum lobes. Spectrum nulls, e.g., points 202 (FIG. 2), may appear, for example, when the signals from both base stations have the same strength. In other embodiments, one or more spectrum nulls may appear due to any other conditions.

In some demonstrative embodiments, a minimum width threshold, denoted $w_{min}$, may be defined with respect to a spectrum lobe, wherein the spectrum lobe may be defined to include a sequence of channel response coefficients having a value greater than a predefined peak threshold.

In some demonstrative embodiments, channel estimator 142 may detect a spectrum lobe having a width lesser then the width threshold; and may determine one or more channel coefficients corresponding to the detected lobe according to Equation 3, while using the negative sign. Channel estimator 142 may determine one or more channel coefficients corresponding to subcarriers not belonging to the detected lobes according to Equation 3, while using the positive sign.

Figure 5:
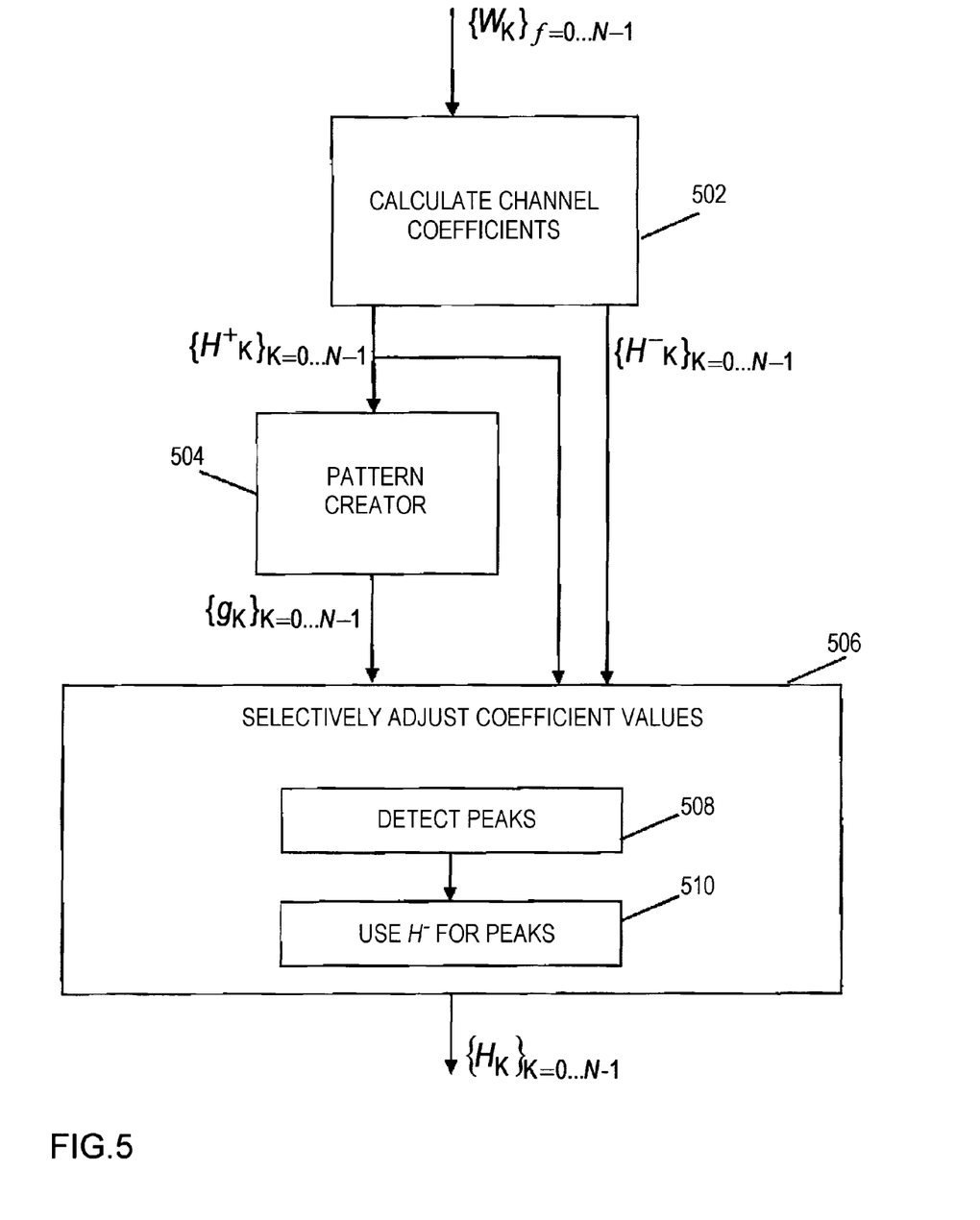
FIG. 5 is a schematic flow-chart illustration of a method of determining a plurality of channel coefficients corresponding to a plurality of subcarriers of a channel, in accordance with some demonstrative embodiments.

Reference is made to FIG. 5, which schematically illustrates a method of determining a plurality of channel coefficients corresponding to a plurality of subcarriers of a channel, in accordance with some demonstrative embodiments.

In some embodiments, one or more of the operations of the method of FIG. 5 may be performed by one or more elements of a receiver, e.g., receiver 112 (FIG. 1), for example, a channel estimator, e.g., channel estimator 142 (FIG. 1).

As indicated at block 502, the method may include determining a plurality of potential channel coefficients corresponding to the channel. For example, channel estimator 142 (FIG. 1) may determine a plurality of potential channel coefficients, e.g., the channel coefficients $\hat{H}_k^+$ according to Equation 3 using the positive sign.

As indicated at block 504, the method may include determining a lobe pattern including a plurality of lobes based on the potential channel coefficients. For example, channel estimator 142 (FIG. 1) may determine a lobe pattern g based on a peak threshold, denoted $H_{max}$, e.g., such that a lobe may include a sequence of potential channel coefficients $\hat{H}_k^+$ having a value greater than the peak threshold $H_{max}$. In one example, channel estimator 142 (FIG. 1) may determine the lobe pattern g as follows:

$$g_k = \begin{cases} 1, & \text{if } |\hat{H}_k^+| \geq 0.1\, \hat{H}_{max}, \\ 0, & \text{if } |\hat{H}_k^+| < 0.1\, \hat{H}_{max} \end{cases} \quad (4)$$

wherein $g_k$ denotes a lobe value corresponding to the k-th subcarrier and having a first value, e.g., one, if the k-th subcarrier is to be included in a lobe, or a second value; e.g., zero, if the k-th subcarrier is not to be included in a lobe.

The peak threshold $H_{max}$ may be defined according to any suitable criteria. For example, the peak threshold $H_{max}$ may be defined based on the potential channel coefficients. In one example, the peak threshold $H_{max}$ may be defined based on a maximal value of the potential channel coefficients, e.g., as follows:

$$\hat{H}_{max} = \max_k \; \{|\hat{H}_k^+|\} \quad (5)$$

Figure 6:
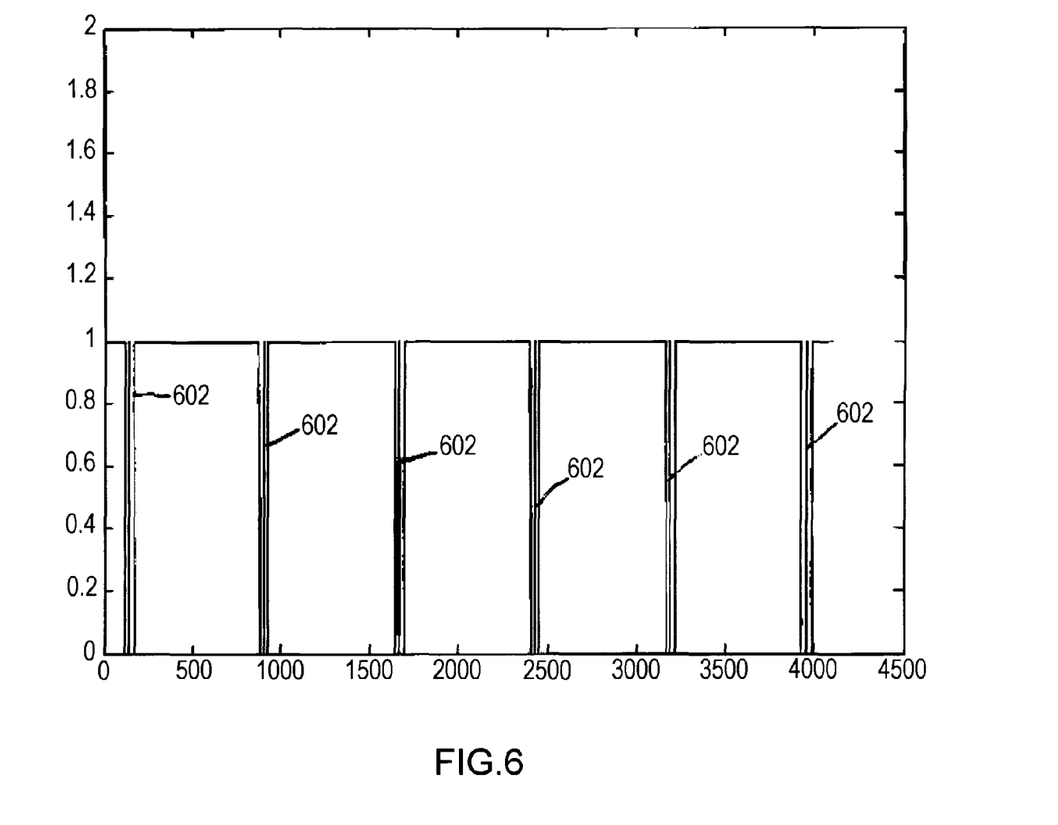
FIG. 6 is a schematic illustration of a lobe pattern corresponding to the estimated channel frequency response of FIG. 4, in accordance with some demonstrative embodiments.

FIG. 6 schematically illustrates a lobe pattern corresponding to the potential channel coefficients $H_k^+$ of the channel response of FIG. 4. As shown in FIG. 6, the lobe pattern corresponding to the potential channel coefficients $H_k^+$ of the channel response of FIG. 4 may include very narrow lobes 602 corresponding to peaks 402 (FIG. 4).

Referring back to FIG. 5, as indicated at block 506, the method may include selectively adjusting one or more of the potential channel coefficients according to a predefined criterion relating to the peak and width thresholds.

As indicated at block 508, selectively adjusting the potential channel coefficients may include detecting lobes corresponding to peaks in the potential channel coefficients. For example, channel estimator 142 (FIG. 1) may detect one or more lobes having a width, which is lesser the threshold width $w_{min}$.

As indicated at block 510, selectively adjusting the potential channel coefficients may include determining an adjusted channel coefficient according to Equation 3 using the negative sign. For example, channel estimator 142 (FIG. 1) may adjust the channel coefficients corresponding to the detected lobes using the channel coefficient $H_k^-$ of the one or more subcarriers included in the lobe.

Figure 7:
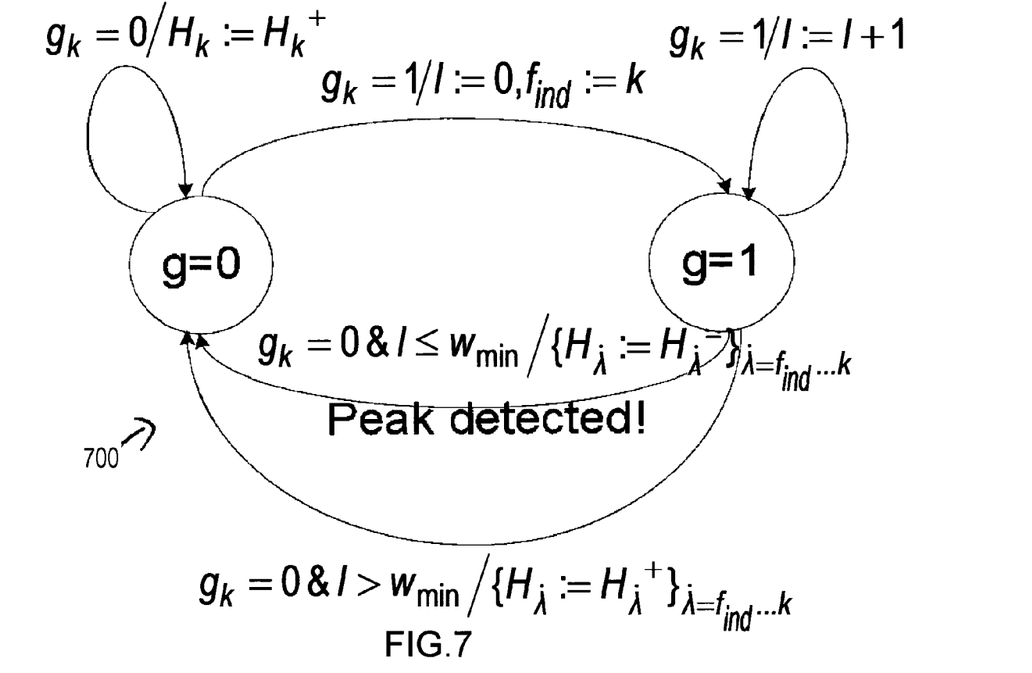
FIG. 7 is a schematic illustration of a state machine, in accordance with some demonstrative embodiments.

Reference is now made to FIG. 7, which schematically illustrates a state machine 700 in accordance with some demonstrative embodiments.

In some demonstrative embodiments state machine 700 may be implemented by a channel estimator, e.g., channel estimator 142 (FIG. 1), to perform one or more operations of the method of FIG. 5, for example, to selectively adjust one or more channel coefficients, e.g., based on the determined lobe pattern g.

In some demonstrative embodiments, state machine 700 may receive an input including the lobe pattern g, e.g., in the form of a vector of length N including N lobe values $g_k$ corresponding to the N subcarriers, respectively.

In some demonstrative embodiments, state machine 700 may also receive a first set of potential channel coefficients $H^+$ including the channel coefficients resulting from using the positive sign in Equation 3, and a second set of potential channel coefficients $H^-$ including the channel coefficients resulting from using the negative sign in Equation 3.

In some demonstrative embodiments, state machine 700 may output the channel frequency response estimation H, e.g., channel response estimation 133 (FIG. 1).

In some demonstrative embodiments, state machine 700 may utilize a first temporal variable, denoted l, to determine a length of a detected lobe/peak; and/or a second temporal variable, denoted $f_{ind}$, to determine a beginning position of a first subcarrier of the detected lobe/peak.

In some demonstrative embodiments, state machine 700 may sequentially run over the subcarriers 0 . . . N-1, and determine the output using the rules shown in FIG. 7, wherein the notation "A/B" denotes an input condition A and a resulting action B; wherein the notation "=" denotes "if equal", and wherein the notation ":=" denotes "set variable/output".

For example, as shown in FIG. 7, state machine 700 may sequentially run over the subcarriers. If the lobe value of the k-th subcarrier is equal to zero, then state machine 700 may set the channel coefficient corresponding to the k-th subcarrier to the corresponding channel coefficient of the channel coefficients $H^+$. Upon detecting the beginning of a lobe, e.g., upon detecting the value g=1, state machine 700 may sequentially run over the following subcarriers, while incrementing the value of l, e.g., as long as the lobe value g=1. State machine 700 may then either set the channel coefficients corresponding to the subcarriers belonging to the detected lobe to the corresponding channel coefficients of the set of channel coefficients $H^+$, e.g., if l is greater than the width threshold $w_{min}$; or to the corresponding channel coefficients of the set of channel coefficients $H^-$, e.g., if l is equal to or lesser than the width threshold $w_{min}$.

Figure 8:
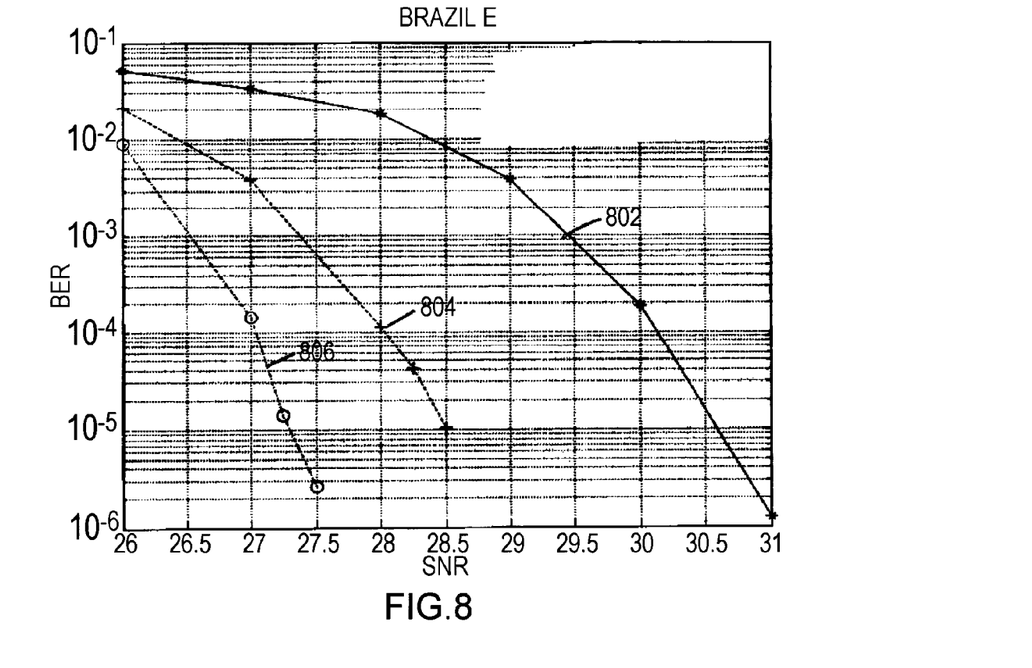
FIG. 8 is a schematic illustration of a graph depicting three receiver performance curves corresponding to three respective receiver schemes, in accordance with some demonstrative embodiments.

Reference is made to FIG. 8, which schematically illustrates a graph depicting receiver performance curves 802, 804 and 806 corresponding to three respective receiver schemes, in accordance with some demonstrative embodiments.

Receiver performance curves 802, 804 and 806 may be determined with respect to a Brazil E channel having three equal strength paths with 1 μs delay between successive paths, e.g., as defined by suitable DTV testing protocols. Performance curves 802, 804 and 806 represent Bit-Error-Ratio (BER) values, e.g., after Reed-Solomon decoding, versus Signal-Noise Ratio (SNR). Curve 802 corresponds to a receiver implementing only a LMS equalization scheme. Curve 804 corresponds to a receiver implementing a turbo equalization scheme, e.g., turbo equalization scheme 130, with a single iteration. Curve 806 corresponds to a receiver implementing a turbo equalization scheme, e.g., turbo equalization scheme 130, with two iterations.

Figure 9:
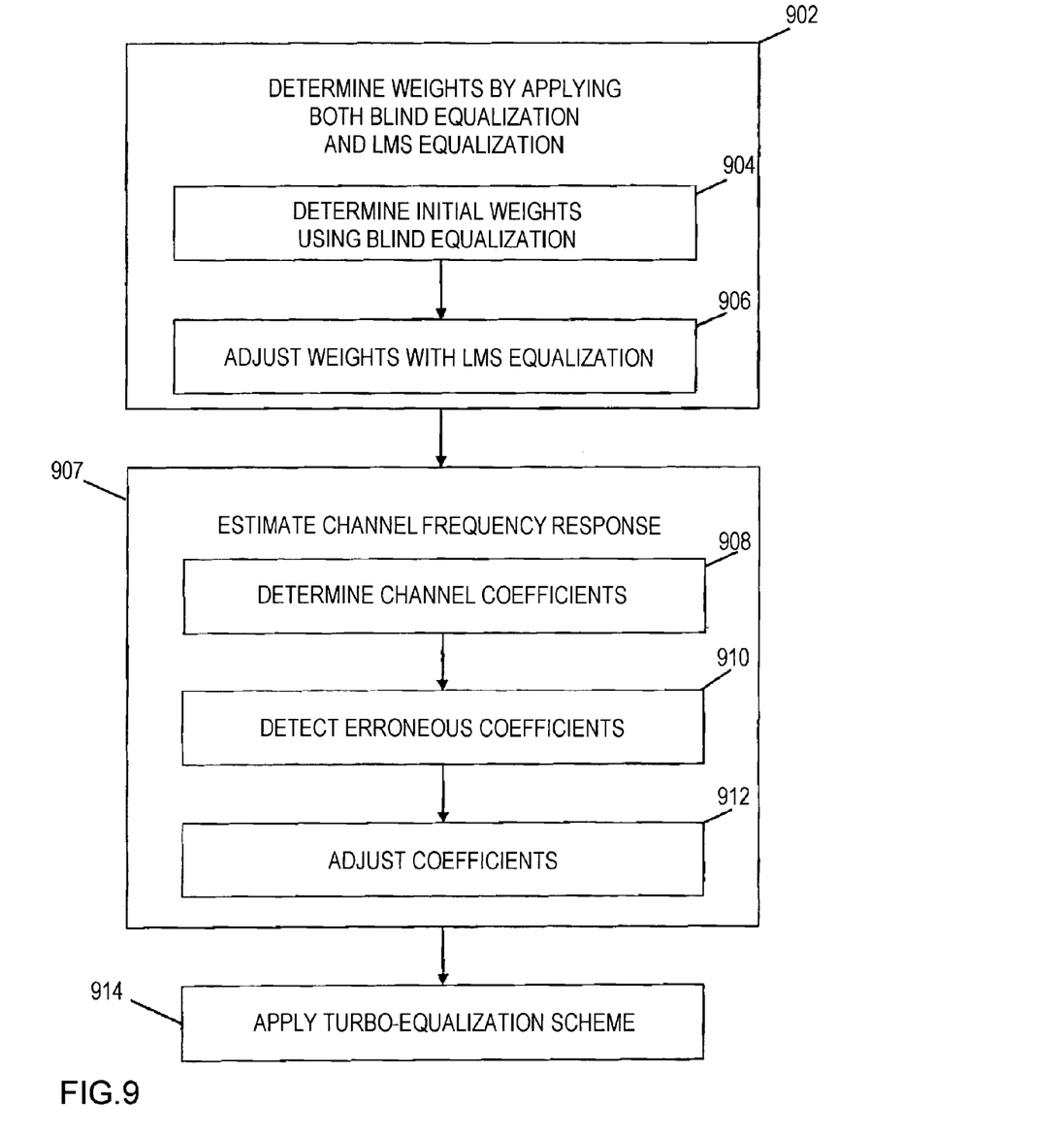
FIG. 9 is a schematic flow-chart illustration of a method of equalizing received wireless communication signals, in accordance with some demonstrative embodiments.

Reference is now mad to FIG. 9, which schematically illustrates a method of equalizing received wireless communication signals, in accordance with some demonstrative embodiments. In some demonstrative embodiments, one or more of the operations of the method of FIG. 9 may be performed by a receiver, e.g., receiver 112 (FIG. 1) to equalize and/or decode a received wireless communication signal, e.g., signal 101 (FIG. 1).

As indicated at block 902, the method may include determining a plurality of filter weights by applying both a blind-equalization and a least-mean-squares (LMS) equalization to the wireless communication signal. For example, pre-decoding equalizer 140 (FIG. 1) may determine weights 146 (FIG. 1), e.g., as described above.

As indicated at block 904, determining the plurality of filter weights may include determining a plurality of initial weight according to the blind equalization. For example, blind equalizer 144 (FIG. 1) may determine initial values of weights 146 (FIG. 1), e.g., as described above.

As indicated at block 906, determining the plurality of filter weights may include adjusting the initial weights according to the LMS equalization. For example, LMS equalizer 148 (FIG. 1) may adjust the initial values of weights 146 (FIG. 1), e.g., as described above.

As indicated at block 907, the method may include estimating a channel frequency response of the wireless communication channel based on the wireless communication signal. For example, the method may include estimating the channel frequency response based on the filtering weights.

As indicated at block 908, estimating a channel frequency response may include determining a plurality of channel coefficients corresponding to a respective plurality of sub-carriers. For example, channel estimator 142 (FIG. 1) may determine the potential channel coefficients $H^+$ corresponding to the N sub-carriers, e.g., as described above.

As indicated at block 910, estimating a channel frequency response may include detecting one or more channel coefficients, which do not satisfy a criterion relating to a peak threshold and a width threshold. For example, channel estimator 142 (FIG. 1) may detect the channel coefficients $H^+$ generating one or more lobes, which do not satisfy the criterion, e.g., as described above.

As indicated at block 912, estimating a channel frequency response may include adjusting and/or recalculating the one or more detected channel coefficients to satisfy the criterion. For example, channel estimator 142 (FIG. 1) may adjust the channel coefficients corresponding to the detected lobes using the channel coefficient $H_k^-$ of the one or more subcarriers included in the lobe, e.g., as described above.

As indicated at block 914, the method may include iteratively decoding and equalizing the wireless communication signal according to a turbo-equalizing scheme using the estimated channel frequency response. For example, equalization scheme 130 (FIG. 1) may iteratively decode and equalize wireless communication signal 101 based on channel response 133 (FIG. 1), e.g., as described above.

Some embodiments may be implemented using an article including one or more types of computer-readable storage media capable of storing data, including volatile memory, non-volatile memory, removable or non-removable memory, erasable or non-erasable memory, writeable or re-writeable memory, and the like. For example, the machine-readable storage medium may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, the article may include logic in the form of instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, the logic may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
    a pre-decoding equalizer to determine a plurality of filter weights by applying both a blind-equalization and a least-mean-squares (LMS) equalization to a wireless communication signal received over a wireless communication channel;
    a channel estimator to estimate a channel frequency response of the channel based on the filtering weights, the channel frequency response including a plurality of channel coefficients corresponding to a respective plurality of channel subcarriers, the plurality of channel coefficients satisfying a criterion relating to a peak threshold and a width threshold; and
    a turbo-equalization scheme including a decoder to decode the wireless communication signal and a turbo equalizer to equalize the decoded wireless communication signal using the estimated channel frequency response.

2. The apparatus of claim 1, wherein the pre-decoding equalizer comprises:
a blind equalizer to determine a plurality of initial weights by applying the blind-equalization to the received wireless communication signal; and
a LMS equalizer to determine the plurality of filtering weights by adjusting the initial weights according to the LMS equalization.

3. The apparatus of claim 1, wherein the criterion requires that, if the channel frequency response includes a sequence of one or more channel coefficients greater than the peak threshold, then a width of a respective sequence of one or more subcarriers corresponding to the sequence of channel coefficients is greater than the width threshold.

4. The apparatus of claim 3, wherein the channel estimator is to determine said channel frequency response satisfying said criterion when an actual channel frequency response of said channel includes one or more nulls.

5. The apparatus of claim 1, wherein the channel estimator is to determine said plurality of channel coefficients according to a first equation, to detect one or more erroneous channel coefficients of said plurality of channel coefficients not satisfying said criterion and to recalculate said one or more erroneous channel coefficients according to a second equation.

6. The apparatus of claim 5, wherein said first and second equations differ by one sign.

7. The apparatus of claim 1, wherein the pre-decoding equalizer is to determine the plurality of filter weights independently of pilot signals received over said channel.

8. The apparatus of claim 7, wherein a repetition period between two consecutive pilot signals received over said channel is at least one hundred times longer than a duration of the pilot signals.

9. The apparatus of claim 1, wherein the wireless communication signal includes a wireless digital television (DTV) signal.

10. The apparatus of claim 9 comprising an Advanced Television Systems Committee (ATSC) receiver.

11. A method comprising:
estimating a channel frequency response of a wireless communication channel based on a wireless communication signal received over said channel, the estimating comprising determining a plurality of channel coefficients corresponding to a respective plurality of sub-carriers, detecting one or more channel coefficients, which do not satisfy a criterion relating to a peak threshold and a width threshold, and recalculating said one or more detected channel coefficients to satisfy said criterion; and
iteratively decoding and equalizing the wireless communication signal according to a turbo-equalizing scheme using the estimated channel frequency response.

12. The method of claim 11 comprising:
determining a plurality of filter weights by applying both a blind-equalization and a least-mean-squares (LMS) equalization to said wireless communication signal; and
estimating said channel frequency response based on the filtering weights.

13. The method of claim 12, wherein determining the plurality of filter weights comprises determining the plurality of filter weights independently of pilot signals received over said channel.

14. The method of claim 11, wherein the criterion requires that, if the channel frequency response includes a sequence of one or more channel coefficients greater than the peak threshold, then a width of a respective sequence of one or more subcarriers corresponding to the sequence of channel coefficients is greater than the width threshold.

15. The method of claim 14 comprising estimating said channel frequency response satisfying said criterion when an actual channel frequency response of said channel includes one or more nulls.

16. The method of claim 11, wherein determining said plurality of channel coefficients comprises determining said plurality of channel coefficients according to a first equation, and wherein recalculating said one or more detected channel coefficients comprises recalculating said one or more detected channel coefficients according to a second equation, different from said first equation.

17. A system comprising:
an apparatus comprising:
one or more antennas to receive a wireless communication signal over a wireless communication channel including a plurality of sub-carriers; and
a receiver to determine a channel frequency response including a plurality of channel coefficients corresponding to said plurality of sub-carriers, to detect one or more channel coefficients, which do not satisfy a criterion relating to a peak threshold and a width threshold, to recalculate said one or more detected channel coefficients to satisfy said criterion, and to iteratively decode and equalize the wireless communication signal according to a turbo-equalizing scheme using the estimated channel frequency response.

18. The system of claim 17, wherein said receiver is to determine a plurality of filter weights by applying both a blind-equalization and a least-mean-squares (LMS) equalization to said wireless communication signal, and to estimate said channel frequency response based on the filtering weights.

19. The system of claim 17, wherein said criterion requires that, if the channel frequency response includes a sequence of one or more channel coefficients greater than the peak threshold, then a width of a respective sequence of one or more subcarriers corresponding to the sequence of channel coefficients is greater than the width threshold.

20. An article including a non-transitory storage medium having stored thereon instructions that, when executed by a machine, result in:
estimating a channel frequency response of a wireless communication channel based on a wireless communication signal received over said channel, the estimating comprising determining a plurality of channel coefficients corresponding to a respective plurality of sub-carriers, detecting one or more channel coefficients, which do not satisfy a criterion relating to a peak threshold and a width threshold, and recalculating said one or more detected channel coefficients to satisfy said criterion; and
iteratively decoding and equalizing the wireless communication signal according to a turbo-equalizing scheme using the estimated channel frequency response.

21. The article of claim 20, wherein said instructions result in:
determining a plurality of filter weights by applying both a blind-equalization and a least-mean-squares (LMS) equalization to said wireless communication signal; and
estimating said channel frequency response based on the filtering weights.

22. The article of claim 21, wherein determining the plurality of filter weights comprises determining the plurality of filter weights independently of pilot signals received over said channel.

23. The article of claim 20, wherein the criterion requires that, if the channel frequency response includes a sequence of one or more channel coefficients greater than the peak threshold, then a width of a respective sequence of one or more subcarriers corresponding to the sequence of channel coefficients is greater than the width threshold.

24. The article of claim 20, wherein determining said plurality of channel coefficients comprises determining said plurality of channel coefficients according to a first equation, and wherein recalculating said one or more detected channel coefficients comprises recalculating said one or more detected channel coefficients according to a second equation, different from said first equation.

* * * * *